United States Patent [19]

Mitchell

[11] Patent Number: 5,165,441

[45] Date of Patent: Nov. 24, 1992

[54] PROCESS AND APPARATUS FOR BLENDING DRAG REDUCER IN SOLVENT

[75] Inventor: Timothy J. Mitchell, Katy, Tex.

[73] Assignee: Conoco Inc., Ponca City, Okla.

[21] Appl. No.: 816,013

[22] Filed: Dec. 30, 1991

[51] Int. Cl.$^5$ .............................................. F17D 1/16
[52] U.S. Cl. ....................................... 137/13; 137/896
[58] Field of Search ............................ 137/13, 896, 1; 366/336, 341

[56] References Cited

U.S. PATENT DOCUMENTS

| | | | |
|---|---|---|---|
| 3,502,103 | 3/1970 | Verschuur | 137/13 X |
| 3,582,050 | 6/1971 | Kozak | 137/13 X |
| 3,826,279 | 7/1974 | Verschuur | 137/13 X |
| 3,886,972 | 6/1975 | Scott | 137/13 X |
| 4,422,830 | 12/1983 | Perkins | |
| 4,688,589 | 8/1987 | Brainerd | |
| 4,722,363 | 2/1988 | Allyn | |
| 4,756,326 | 7/1988 | Johnston | |
| 4,771,799 | 9/1988 | Baxter et al. | |
| 4,771,800 | 9/1988 | Pomeroy | |
| 5,067,508 | 11/1991 | Lee | 137/13 |

Primary Examiner—Alan Cohan

[57] ABSTRACT

A viscous polymer is passed through a filament or thread forming apparatus and introduced into a flowing solvent. The polymer containing solvent is then passed through a random flow path apparatus where the polymer is broken into fine particles and the solvent and polymer are thoroughly blended. The polymer and solvent leaving the random flow path apparatus may be introduced into a holding apparatus wherein the polymer and solvent are retained until the polymer has gelled.

18 Claims, 3 Drawing Sheets

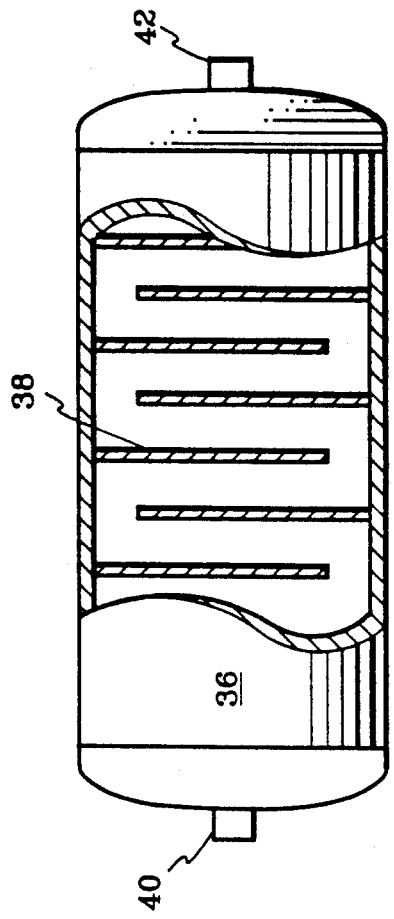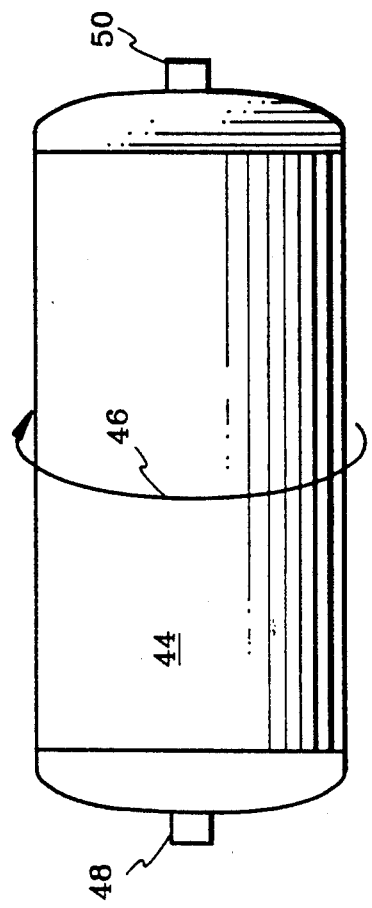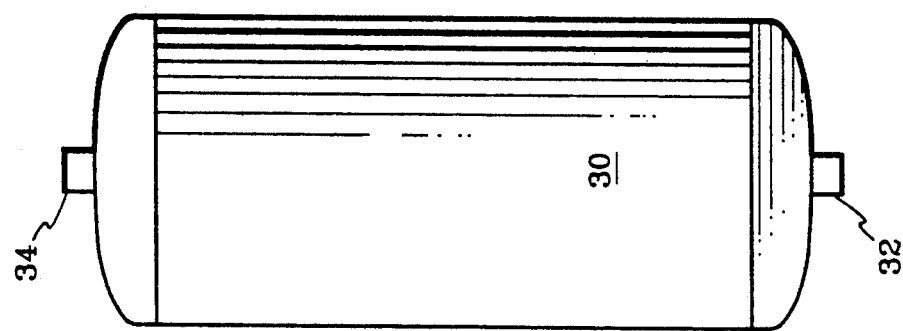

PROCESS AND APPARATUS FOR BLENDING DRAG REDUCER IN SOLVENT

BACKGROUND OF THE INVENTION

Drag reduction of hydrocarbon fluids flowing through conduits is well known. An example of such an operation is described in U.S. Pat. No. 3,626,676 which provides a method by which the percent drag reduction can be measured. The reference describes inserting the drag reducing additives as a polymeric liquid. Other representative art in the area includes U.S. Pat. No. 3,736,288 in which various drag reducing formulations are added to exhibit a staggered dissolving or controlled dissolving characteristic using varying molecular weight fractions and/or particle sizes. These materials are added as polymeric solids. The reference also discloses pumpability, pourability, stratification resistance, and the like of these solutions. U.S. Pat. No. 3,601,079 describes a water-soluble, polymeric material mixed with water in a mixing chamber prior to injection into a pipeline. U.S. Pat. No. 3,884,252 describes a process for reducing oxidative degradation and cold flow of polymer crumb by immersing the crumb in a non-solvent and then dusting prior to injecting the polymer crumb or slurry of polymer crumb and water into a hydrocarbon fluid and allowing the crumb to gradually and continuously dissolve throughout the pipeline. Injection of friction reducing polymers is also described in U.S. Pat. No. 4,263,929. A drag reducing dispersing metering system is described in U.S. Pat. No. 3,900,034.

There also exists a group of art relating to a method for dissolving polymers in solvent. This art does not specifically mention pipelining of fluids. This area of art is represented by U.S. Pat. Nos. 2,639,275; 3,468,322; 3,891,593, and 4,537,513. These patents all deal with methods for dissolving a fixed amount of polymer in a fixed amount of solvent, utilizing recycling or dissolving means. However, such methods of dissolving polymer require extra apparatus, and it would be highly preferable to directly inject drag reducing agents into a pipeline.

The performance of drag reducing additives is highly dependent upon the dissolution of these additives in the flowing liquid. Addition of solid materials to a pipeline and allowing dissolution as the material travels to the pipeline has not been found to be an effective means of promoting drag reduction, since the materials are not dissolved at the time during which they are needed to provide drag reducing effects. It has been found preferable to inject the materials in a dissolved state or in a highly viscous concentrate in order to promote drag reduction by the dissolution of the polymer.

It would therefore be of great benefit to provide a method and apparatus whereby high molecular weight drag reducing polymers can be introduced into fluids flowing through conduits in a manner to increase the performance of the drag reducing material.

PRIOR ART

U.S. Pat. No. 4,422,830 to Perkins, teaches that pump performance is enhanced when pumping a viscous chemical liquid by simultaneously pumping a compatible low viscosity liquid into the suction side of the injection pump. The low viscosity liquid acts as a lubricant and also assists in the dissolution or dispersion of the additive in the fluid flowing through a pipeline.

U.S. Pat. No. 4,688,589 to Brainert et al., discloses a process in which a drag reducer is introduced to flowing hydrocarbon through a probe installed in a pipeline with openings facing downstream and located away from the centerline of the pipeline.

U.S. Pat. No. 4,722,363 to Allyn discloses a process in which a drag reducer is educted into flowing hydrocarbon in a pipeline. The educted drag reducer is introduced to the pipeline through a donut-shaped manifold surrounding the pipeline and opening to the pipeline through a number of injection conduits spaced around the surface of the manifold facing the pipeline.

U.S. Pat. No. 4,756,326 to Johnston discloses introducing a drag reducer to a conduit containing flowing liquid through land-length dies having multiple openings. Each opening preferably is approximately at equal distance from the conduit wall.

U.S. Pat. No. 4,771,799 to Pomeroy discloses introducing drag reducer into hydrocarbon fluids flowing through a conduit through dies having multiple orifices no larger than 2 millimeters in diameter.

U.S. Pat. No. 4,771,800 to Pomeroy discloses the introduction of a drag reducer into a flowing hydrocarbon through dies having multiple openings where the die openings are located substantially at the injection end of the die.

THE INVENTION

In the process and apparatus of the invention, a viscous polymer (a) is passed through a filament or a thread forming means and is introduced into a flowing solvent and (b) the polymer containing solvent is passed into a random flow path means where the polymer is broken into fine particles and the solvent and polymer are thoroughly blended.

In one aspect of the invention, the viscous polymer is a drag reducer and is introduced to a flowing hydrocarbon stream to reduce pressure drop.

In another aspect of the invention, the polymer and solvent leaving the random flow path means are introduced to a holding means wherein the polymer and solvent are retained until the polymer has gelled. The polymer may be stored until such time as it is ready for use.

Various other aspects of the invention relate to specific apparatus employed to obtain the desired polymer-solvent product.

THE DRAWINGS

FIGS. 4A, 4B, and 4C illustrate various embodiments of holding apparatus.

DETAILED DESCRIPTION OF THE INVENTION

While the process and apparatus of the invention may be used with any viscous polymers, particular application is found in systems where oil soluble drag reducers are used to reduce friction in hydrocarbon fluids flowing through pipelines or other conduits. Oil soluble drag reducers which may be used include, but are not limited to, such materials as polyisobutylene, polyacrylates, polystyrene derivatives, polydimethylsiloxane, polyisoprene, polybutadiene, cyclopentene polymers, and copolymers of cyclopentene with other ethylenically unsaturated hydrocarbons such as isobutene, octene, butadiene and isoprene. Particularly desirable drag reducers are high molecular weight non-crystalline hydrocarbon soluble polyolefin homopolymers and copolymers in which the olefin monomers may contain from 2 to 30 carbon atoms. All of the various drag reducing materials and their metholds of preparation are well known in the art. For example, U.S. Pat. No. 4,493,903 to Mack discloses a method for producing ultra high molecular weight oil soluble non-crystalline polymers of alphaolefins.

The drag reducers may have molecular weights ranging from 250,000 to as high as 5 to 10 million or higher. Usually more effective drag reduction is obtained with higher molecular weight materials. Polyolefin drag reducers preferably have an inherent viscosity of about 9 to about 18 deciliters/gm which equates to a molecular weight of about $1 \times 10^6$ to about $30 \times 10^6$.

The solvents employed with the oil soluble drag reducers are nonpolar and are miscible with such drag reducers. Examples of such nonpolar materials are generally the organic solvents, including such materials as saturated and unsaturated hydrocarbons, as for example, hexane, benzene, and mixtures thereof; liquified petroleum gases; gasoline; diesel oil; and kerosine. It is also within the scope of the invention to use as the solvent a portion of the hydrocarbon stream to which the drag reducer is added for friction reduction.

The amount of solvent used with the drag reducer will vary depending on the particular polymer employed and the specific solvent used. Ordinarily, the polymer solvent blend will contain from about 1 to about 50 weight percent drag reducer, preferably from about 10 to about 20 percent.

Figure 1:
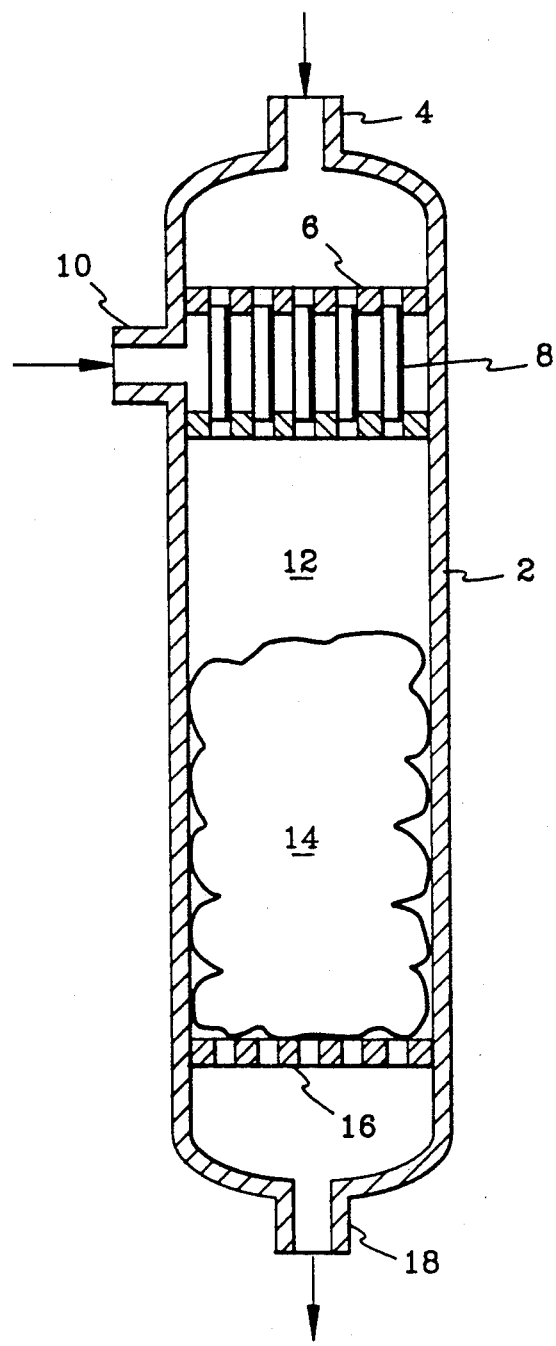
FIG. 1 is a schematic drawing of an apparatus for forming polymer filaments and threads, apparatus for providing shear-strain, and a holding apparatus.

The invention is best described by reference to the drawings. FIG. 1 shows an elongated tube or cylinder 2 containing in the upper portion thereof a manifold 6 containing a plurality of small tubes in axial alignment and spaced along the cross section of cylinder 2. Manifold 6 opens into an unobstructed portion 12 of cylinder 2 below which is disposed a mass 14 of wire-like mesh material such as steel wool which is supported on a perforated plate 16.

Figure 2:
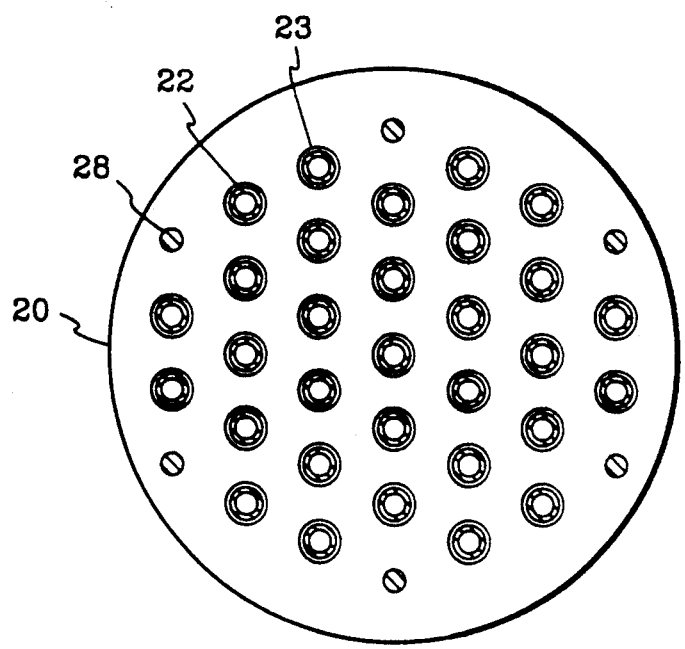
FIGS. 2 and 3 are more detailed schematic drawings of apparatus for forming polymer filaments and threads
Figure 3:
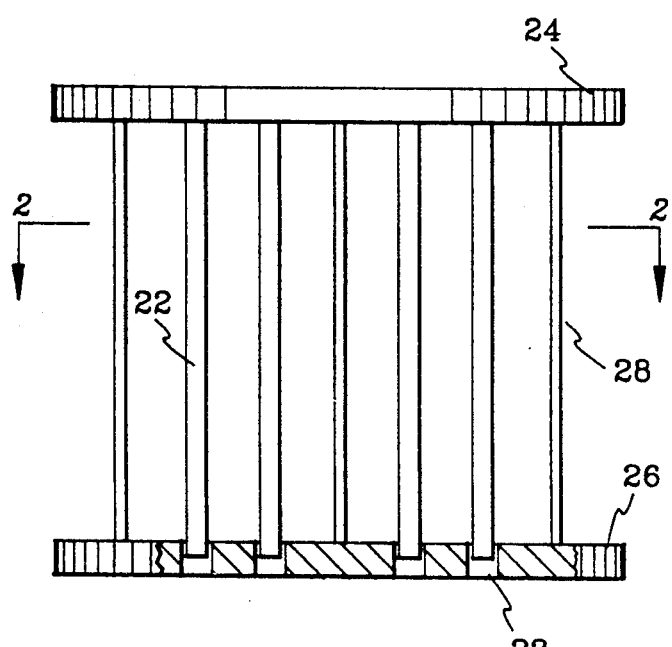

The manifold shown in FIG. 1 is presented in more detail in FIGS. 2 and 3. Referring to these figures, the manifold designated 20 is comprised of upper and lower plates 24 and 26, which are perforated to receive tubings 22. The upper and lower plates are held in the proper spaced position by rods 28. The tubes may be held in plate 24 by soldering, welding, gluing or other suitable means. The tubes extend into or through plate 26 with an annulus between each tube and the plate opening 23 thereby allowing passage of solvent and entrained polymer into the unobstructed portion 12 of cylinder 2. The dimensions of the annulus are not critical but are of sufficient size to allow the desired flow of solvent.

In carrying out the process of the invention, a solvent such as kerosene is introduced through inlet 10 into the area of manifold 6 surrounding tubes 8. After introduction of the solvent, a viscous polymer, such as a high molecular weight alpha-olefin polymer drag reducer, is introduced to cylinder 2 through inlet 4 and passes into manifold 6 and through Pipes 8. Upon leaving the outlets of pipes 8, the polymer which has been formed into filaments or threads is surrounded by solvent flowing parallel to the exiting polymer, and the mixture of solvent and polymer filaments or threads passes into the unobstructed portion of cylinder 2. Shortly thereafter, the solvent polymer mixture enters the mass 14 of wire-like mesh material, in this instance, steel wool, where the polymer filaments and strands are broken up into small particles of polymer. The solvent containing the small particles of polymer then passes through plate 16 and exits cylinders 2 through 18.

The mesh material used to provide the random flow path for the solvent polymer mixture may be made up of any material which retains its shape and has sufficient strength to withstand the flow of solvent and polymer through it at the velocities encountered in carrying out the process. Specific materials which may be used include steel wool, glass wool, wire-like mesh materials made from plastics or rubbers, or other similar materials. Glass or metal beads of round or random shape may also be used.

As the polymer dissolves in the solvent, it begins to swell and the blend becomes more viscous, eventually forming a gel. If the polymer solvent mixture is not to be used immediately and is stored before the blend has fully gelled, separation between the polymer and solvent can occur, since the solvent density is normally different than the density of the polymer. However, if the size of the polymer particles in the solvent leaving cylinder 2 is sufficiently small, separation may not occur even though the polymer has not completely gelled.

To avoid any possibility of separation of the polymer and solvent during storage, the polymer solvent mixture leaving cylinder 2 may be introduced to a holding vessel where the mixture may be retained for a sufficient period of time to assure complete gelling of the polymer. To effect this result, the polymer solvent mixture is introduced to one of the holding vessels shown in FIGS. 4A, 4B, and 4C. Each of these vessels is much larger than cylinder 2 so that a substantial holding time for the polymer is provided In FIG. 4A, the holding vessel 30 is simply a vertical vessel with the polymer solvent mixture being introduced to the bottom through inlet 32 and withdrawn after sufficient holding time through outlet 34. In FIG. 4B, the holding vessel 36 contains a series of baffles 38 whereby the solvent polymer mixture entering through inlet 40 is subjected to gentle agitation during the holding time and is ultimately removed from the holding tank through outlet 42. FIG. 4C represents a holding tank 44 which is a horizontal vessel containing an inlet 48 and outlet 50, which can be rotated in the direction shown at 46 by a suitable motor and belt apparatus or other suitable apparatus (not shown).

If the drag reducer polymer is to be injected into a hydrocarbon pipeline immediately following its passage through cylinder 2, then the holding tank is not necessary. Also, if the solvent employed in the process is about the same density as the drag reducer polymer, then a holding tank probably would not be required.

With reference to the manifold 6 contained in cylinder 2, the size of the openings in tubes 8 will vary from about 0.04 inches to about 0.125 inches in diameter. The number of tubes 8 contained in the manifold will of course vary depending on the cross section of cylinder 2 and the rate at which polymer is passed through manifold 6. The length of tubes 8 in manifold 6 may be varied from about 0.5 to about 4.0 inches. A substantial driving force is required to move the polymer through tubes 8 into the unobstructed portion 12 of cylinder 2. Usually this driving force will be from about 10 to about 1000 psig.

The flow rate of solvent in the unobstructed portion 12 of cylinder 2 will vary from about 0.5 to about 20 ft/sec and preferably from about 5 to about 10 ft/sec. The flow rate of the solvent is controlled to provide a velocity equal to or greater than the velocity of the polymer leaving tubes 8 so that the solvent in effect exerts a pulling force on the polymer filaments or threads exiting Manifold 6.

Because of the obstruction to flow provided by steel wool 14, the velocity of the solvent polymer mixture through steel wool 14 is substantially higher than the flow rate in the unobstructed portion 12 of cylinder 2. This increased velocity which is usually between about 1 and about 50 ft/sec aids in the process of breaking up the polymer filaments or threads into fine particles.

The velocity of the solvent polymer mixture in the holding vessel is so low as not to be significant. The holding time in this vessel usually varies from about 10 to about 60 minutes and preferably from about 15 to about 30 minutes. In any event the holding time is such that the solvent polymer blend has sufficient time to substantially complete gelling before exiting the holding vessel. Once the blend of polymer and solvent has completely gelled, the viscosity of the blend is sufficient to keep the solvent and polymer from separating during storage.

The apparatus and process of the invention have a number of advantages. For example, the drag reducer-solvent blend can be made on site using an available solvent source such as a slipstream off a pipeline, or stored petroleum. Blends can be initiated and completed within 15 minutes or less from start-up time. The process is continuous as compared to batch processes. The rate of blend production can be varied to meet demand. The total apparatus is compact, thus it would take up minimal space on an offshore platform.

The various parts of the apparatus of the invention, i.e. the manifold and tubes, the cylinder containing the manifold, the holding tanks, etc. are usually constructed of metals, such as steel or other metal alloys. It is also within the scope of the invention however to use other materials of construction, at least in part, such as glass and industrial plastics and polymers.

While certain embodiments and details have been shown for the purpose of illustrating the present invention, it will be apparent to those skilled in the art that various changes and modifications may be made herein without departing from the spirit or scope of the invention.

We claim:

1. A process for blending a viscous polymer in a solvent which comprises:
    (a) introducing viscous polymer into one end of an elongated zone containing as plurality of small tubular zones in axial alignment with the elongated zone and spaced across the cross-section of said elongated zone,
    (b) passing the viscous polymer through the small tubular zones into an unobstructed portion of the elongated zone, whereby the viscous polymer enters said unobstructed portion in the form of filaments or threads,
    (c) introducing solvent into the elongated zone downstream of the point at which the viscous polymer enters the small tubular zones, whereby solvent enters into the unobstructed portion of the elongated zone in contact with and surrounding the filaments or threads of polymer,
    (d) passing the solvent containing viscous polymer from the unobstructed portion of the elongated zone through restricted random flow paths at increased velocity, whereby the viscous polymer is broken into fine particles,
    (e) removing the solvent containing polymer from the other end of the elongated zone.

2. The process of claim 1 in which the solvent containing viscous polymer particles is introduced to a second zone wherein the viscous polymer contained in the solvent is retained for a sufficient period of time to effect gelling of the polymer.

3. The process of claim 1 in which the solvent containing viscous polymer has a composition of from about 1 percent to about 50 percent drag reducer by weight.

4. The process of claim 3 in which the velocity of the solvent containing viscous polymer in the unobstructed portion of the elongated zone is between about 0.5 and about 20 ft/sec.

5. The process of claim 3 in which the small tubular zones in the elongated zone vary in size from about 0.04 to about 0.125 inches in diameter.

6. The process of claim 3 in which the velocity of the solvent containing viscous polymer in the restricted random flow paths is between about 1 and about 50 ft/sec.

7. The process of claim 2 in which the residence time of the solvent containing viscous polymer in the second zone is between about 10 and about 60 minutes.

8. The process of claim 1 in which the velocity of the solvent containing viscous polymer in the unobstructed portion of the elongated zone is between about 0.5 and about 20 ft/sec and the velocity of the solvent containing viscous polymer in the restricted random flow paths is between about 1 and about 50 ft/sec.

9. The process of claim 8 in which the small tubular zones in the elongated zone vary in size from about 0.04 to about 0.125 inches in diameter.

10. The process of claim 9 in which the viscous polymer is forced through the small tubular zones in the elongated zone by a differential pressure between about 10 and about 1000 psig.

11. A process for blending a viscous polymer in a solvent which comprises:
    (a) introducing viscous polymer into one end of an elongated zone containing as plurality of small tubular zones in axial alignment with said elongated zone and spaced across the cross-section of said elongated zone,
    (b) passing the viscous polymer through the small tubular zones into an unobstructed portion of the elongated zone, whereby the viscous polymer enters said unobstructed portion in the form of filaments or threads,
    (c) introducing solvent into the elongated zone downstream of the point at which the viscous polymer enters the small tubular zones, whereby solvent enters into the unobstructed portion of the elongated zone in contact with and surrounding the filaments or threads of polymer,
    (d) passing the solvent containing viscous polymer from the unobstructed portion of the elongated zone through restricted random flow paths at increased velocity, whereby the viscous polymer is broken into fine particles, (e) removing the solvent containing polymer from the other end of the elongated zone, and (f) injecting the solvent containing viscous polymer into a flowing stream of hydrocarbon liquid.

12. The process of claim 11 in which the solvent containing viscous polymer has a composition of from about 1 percent to about 50 percent drag reducer by weight.

13. The process of claim 12 in which the velocity of the solvent containing polymer in the unobstructed portion of the elongated zone is between about 0.5 and about 20 ft/sec.

14. The process of claim 12 in which the small tubular zones in the elongated zone vary in size from about 0.04 to about 0.125 inches in diameter.

15. The process of claim 12 in which the velocity of the solvent containing viscous polymer in the restricted random flow paths is between about 1 and about 50 ft/sec.

16. The process of claim 11 in which the velocity of the solvent containing viscous polymer in the unobstructed portion of the elongated zone is between about 0.5 and about 20 ft/sec, the velocity of the solvent containing viscous polymer in the restricted random flow paths is between about 1 and about 50 ft/sec.

17. The process of claim 16 in which the small tubular zones in the elongated zone vary in size from about 0.04 to about 0.125 inches in diameter.

18. The process of claim 17 in which the viscous polymer is forced through the small tubular zones in the elongated zone by a differential pressure between about 10 and about 1000 psig.

* * * * *